Patented Mar. 15, 1938

2,111,479

UNITED STATES PATENT OFFICE

2,111,479

LIGHT-SENSITIVE DERIVATIVES OF VAT DYESTUFFS AND A PROCESS OF PREPARING THEM

Paul Ochwat, Frankfort-on-the-Main-Hochst, and Bruno Wendt, Dessau, Germany, assignors to Agfa Ansco Corporation, Binghamton, N. Y., a corporation of New York No Drawing. Application November 24, 1936, Serial No. 112,610. In Germany January 11, 1932

8 Claims. (Cl. 260—44)

The present invention relates to light-sensitive derivatives of vat dyestuffs and a process of preparing them.

This application is an improvement of U. S. Patent No. 2,082,178 issued June 1, 1937 (application Serial No. 650,590, filed January 6, 1933 in the names of Paul Ochwat and Bruno Wendt).

We have found that light-sensitive substances of valuable properties are obtainable by reacting a water-soluble salt of a leuco ester of a vat dyestuff, the ester being formed by means of a polybasic inorganic acid upon a watersoluble salt of an N-nitroso-aryl-hydroxylamine, aryl being of the benzene series, in the presence of an inert solvent. When using an ester salt of a leuco vat dyestuff with a volatile base, the base may be removed, if desired, by distillation from the reaction mixture. The constitution of the new light-sensitive substances is not known. They are applicable with advantage for photographic purposes, for instance, for the production of multi-color pictures. The leuco esters of vat dyestuffs used as parent materials, being formed by means of sulfuric acid, may be prepared according to the processes described in U. S. patent specification No. 1,448,251, British patent specifications Nos. 247,787, 251,491, 260,638, or being formed by means of phosphoric acid, may be prepared according to the processes described in British patent specifications Nos. 260,647 and 248,802.

Light-sensitive layers may be prepared, for instance, in one of the following ways: The new products above mentioned may be incorporated with a suitable binding agent such as gelatine, glue, collodion or the like, and this mixture may be applied on a support; or the said new products may be produced by combining the ester-salts of the leuco vat dyestuffs and the salts of N-nitroso-aryl-hydroxylamines in a layer of a binding agent which has already been applied on a support; or the products are incorporated with or produced, without formation of a layer, in paper, cellulosehydrate sheets or the like.

The reaction between an ester salt of a leuco vat dyestuff with a base, such as pyridine, on the one hand, and with a salt of N-nitroso-aryl-hydroxylamine, on the other hand, may be performed, for instance, by removing with steam the volatile base from the aqueous solution or suspension of the components. By evaporation, the new products are obtainable in the form of powders easily soluble in water.

It has already been proposed to produce light-sensitive layers by means of alkali salts of sulfuric acid esters of leuco vat dyestuffs. The layers obtainable according to the present invention have over the said known layers the advantage of yielding a better gradation and purer lights and of being more stable in the dark.

According to our new process cellulosehydrate films or sheets may be used with special advantage for the production of one-color or multi-color pictures. As illustrated in the following examples, the sheets are impregnated at ordinary or raised temperature with the respective solution. By applying an elevated temperature, the impregnation is accelerated, which is also the case by adding a precipitant, such as sodium sulfate, in a quantity insufficient for precipitation. The addition of gylcerine to the impregnating liquor renders the dry sheets pliable and increases, by its humidifying action, the sensitiveness of the light-sensitive compound. This latter advantage may also be achieved by the addition of another hygroscopic substance. In the photography of natural colors there are used separate sheets containing incorporated therewith according to one of the above mentioned methods the derivatives of the leuco compounds of a yellow, a purple-red and a bluish-green, respectively, dyestuff, which sheets after being printed, fixed and, advantageously, impregnated with a glycerine solution are glued together one on the other in known manner, for instance, by means of gelatine solution in paper.

Cellulose-derivative films or sheets which superficially have been rendered sensitive to water by means of a saponifying agent, for instance, an acetyl or a nitro-acetate film, may be used in an analogous manner. When used for the multi-color photography or for the production of anaglyphic pictures the two or more partial pictures, the two stereo pictures respectively, are printed in succession one above the other on a material sensitized in accordance with the invention in such a manner that after the first printing operation the print is fixed by washing with water and the material is sensitized for the next printing operation and so on.

The following examples serve to illustrate the invention, but they are not intended to limit it thereto, the parts being by weight:

(1) Into a solution containing 1/10 mol. of the sodium salt of the sulfuric acid ester of leuco-4.4'-dichloro-5.5'-dibromindigo there is introduced pyridine hydrochloride until the dyestuff has been precipitated as difficultly soluble pyridine salt. The latter is isolated, made into a paste with water, 2/10 mol. of the sodium salt of N-nitroso-phenyl-hydroxylamine as well as a 10% excess thereof are added, and steam is passed through the whole until pyridine no longer distils over.

There is obtained a solution from which the new product may be obtained by evaporation. It forms a powder which is easily soluble in water. When the solution is heated with dilute acids, the vat dyestuff precipitates. In materials impregnated with said solution the vat dyestuff is reformed on exposure to light.

In the same manner the sulfuric acid esters of other leuco vat dyestuffs may be used for the preparation of new products. Instead of N-nitroso-phenyl-hydroxylamine there may also be used the derivatives and substitution products thereof.

(2) In similar manner a light-sensitive product may be prepared from: 4 grams of the sodium salt of the sulfuric acid ester of leuco 4.4'-dichloro-5.5'-dibromindigo, 4 grams of the ammonium salt of N-nitroso-phenyl-hydroxylamine, 20 cc. of glycerine and 80 cc. of water.

(3) 4 grams of the sodium salt of phosphoric acid ester of leuco 4.4'-dimethyl-6.6'-dichloro-thioindigo are dissolved in a mixture of 40 cc. of glycerine and 60 cc. of water and there is added to the solution 1 gram of the sodium salt of N-nitroso-para-chlorphenyl-hydroxylamine. With this solution cellulosehydrate sheets are impregnated for 10 minutes at room temperature and then dried. After printing, whereby a purple-red picture with pure lights is obtained, the sheets are washed with warm water, whereby the unexposed substance is removed.

(4) A cellulosehydrate sheet is impregnated with a solution prepared from 5 kilos of the sodium salt of the sulfuric acid ester of leuco 4.4'-dimethyl-5.7.6'-trichlorthioindigo, 2 kilos of the sodium salt of N-nitroso-phenyl-hydroxylamine, 40 liters of glycerine and 90 liters of water. After squeezing off the adherent solution, the sheet is dried, rolled up and cut to the desired sizes. By printing a negative on one of the sheets a bluish-red picture of very good gradation and pure lights is obtained, it is washed for 5 minutes in water of 70° and thereby fixed.

(5) 100 parts of the dyestuff having the following constitution:

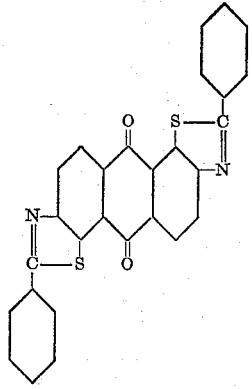

obtainable according to the process of Example 1 of German Patent No. 260,905, are transformed into the leuco sulfuric ester in a manner known to be available for a like transformation in other cases. The pyridine salt of the ester, obtainable according to the process of Example 1 is mixed while stirring, with a solution of 80 parts of the sodium salt of N-nitroso-phenyl-hydroxylamine in water, the pyridine is distilled off with steam, the solution is clarified and concentrated under reduced pressure. The new compound crystallizes on cooling and is filtered off. It is readily soluble in water. By heating its solution with addition of a dilute acid the vat dyestuff is reformed.

(6) A light-sensitive product according to Example 5 is also obtained by mixing the ester of Example 5 not in the form of the pyridine salt sparingly soluble in water, but in the form of the soluble sodium salt with the indicated quantity of the nitroso compound in the presence of glycerine and water, as described in Example 2.

We claim:

1. The process which comprises mixing a water-soluble salt of a leuco ester of the vat dyestuff of the formula:

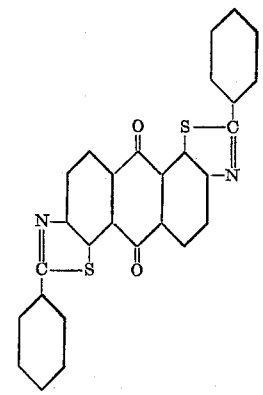

the ester being formed by means of an acid of the group consisting of sulfuric and phosphoric acid, with a watersoluble salt of an N-nitroso-aryl-hydroxylamine, aryl being of the benzene series, in the presence of an inert solvent.

2. The process which comprises mixing a water-soluble salt of a leuco ester of a vat dyestuff of the formula:

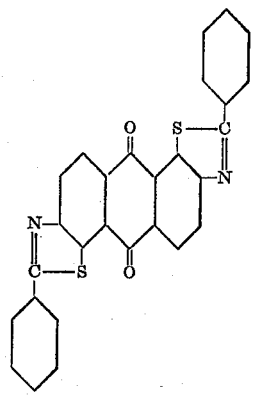

the ester being formed by means of an acid of the group consisting of sulfuric and phosphoric acid, with a watersoluble salt of an N-nitroso-phenyl-hydroxylamine in the presence of an inert solvent.

3. The process which comprises mixing the pyridine salt of the sulfuric acid ester of the leuco compound of the dyestuff of the formula:

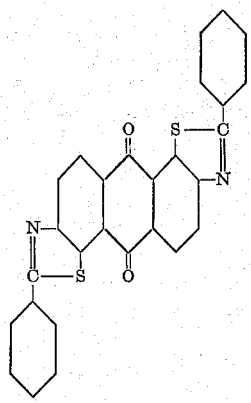

with the sodium salt of N-nitroso-phenyl-hydroxylamine in the presence of water and distilling off the pyridine from the reaction mixture by steam distillation.

4. The process which comprises mixing the sodium salt of the sulfuric acid ester of the leuco compound of the dyestuff of the formula:

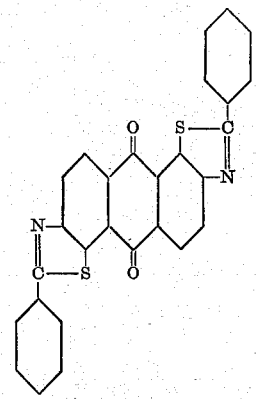

with the sodium salt of N-nitroso-phenyl-hydroxylamine in the presence of glycerol and water.

5. The compounds identical with those which are obtainable by the process which comprises mixing a watersoluble salt of a leuco ester of the vat dyestuff of the formula:

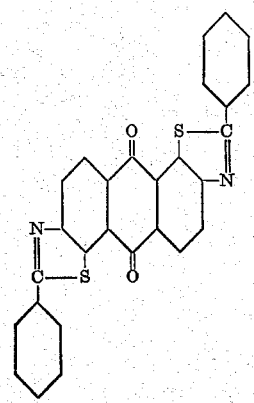

the ester being formed by means of an acid of the group consisting of sulfuric and phosphoric acid, with a watersoluble salt of an N-nitroso-aryl-hydroxylamine, aryl being of the benzene series, in the presence of an inert solvent.

6. The compounds identical with those which are obtainable by the process which comprises mixing a watersoluble salt of a leuco ester of the vat dyestuff of the formula:

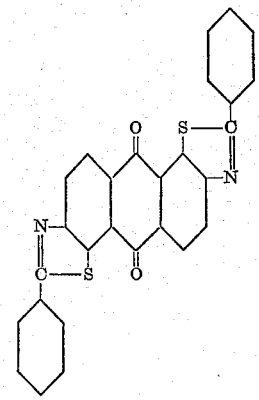

the ester being formed by means of an acid of the group consisting of sulfuric and phosphoric acid, with a watersoluble salt of an N-nitroso-phenyl-hydroxylamine in the presence of an inert solvent.

7. The compounds identical with those which are obtainable by the process which comprises mixing the pyridine salt of the sulfuric acid ester of the leuco compound of the dyestuff of the formula:

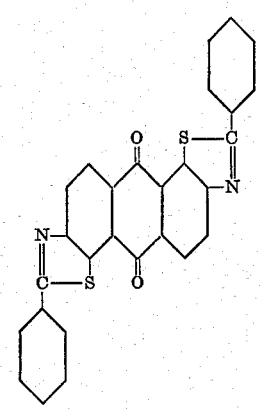

with the sodium salt of N-nitroso-phenyl-hydroxylamine in the presence of water and distilling off pyridine from the reaction mixture by steam distillation.

8. The compounds identical with those which are obtainable by the process which comprises mixing the sodium salt of the sulfuric acid ester of the leuco compound of the dyestuff of the formula:

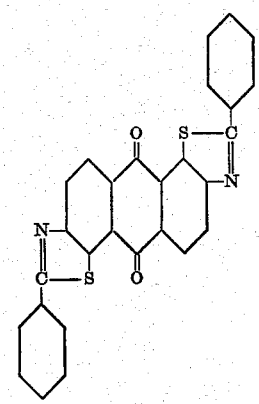

with the sodium salt of N-nitroso-phenyl-hydroxylamine in the presence of glycerol and water.

PAUL OCHWAT.
BRUNO WENDT.